United States Patent
Plate et al.

(10) Patent No.: US 9,009,534 B2
(45) Date of Patent: Apr. 14, 2015

(54) RUNTIME CONFIGURATION CHECKS FOR COMPOSITE APPLICATIONS

(75) Inventors: Henrik Plate, Nice (FR); Serena Ponta, Nice (FR); Matteo Maria Casalino, Nice (FR); Theodoor Scholte, Antibes (FR)

(73) Assignee: SAP SE, Walldorf (DE)

( * ) Notice: Subject to any disclaimer, the term of this patent is extended or adjusted under 35 U.S.C. 154(b) by 226 days.

(21) Appl. No.: 13/479,743

(22) Filed: May 24, 2012

(65) Prior Publication Data

US 2013/0318396 A1 Nov. 28, 2013

(51) Int. Cl.
*G06F 11/00* (2006.01)
*G06F 11/36* (2006.01)

(52) U.S. Cl.
CPC .................................. *G06F 11/3612* (2013.01)

(58) Field of Classification Search
USPC .................................. 714/38.1; 709/220, 224
See application file for complete search history.

(56) References Cited

U.S. PATENT DOCUMENTS

| | | | |
|---|---|---|---|
| 8,065,397 B2* | 11/2011 | Taylor et al. .................. | 709/220 |
| 8,612,574 B2* | 12/2013 | Akiyama et al. .............. | 709/224 |
| 8,639,798 B2* | 1/2014 | Akiyama et al. .............. | 709/224 |
| 2006/0031476 A1* | 2/2006 | Mathes et al. ................. | 709/224 |
| 2007/0203952 A1* | 8/2007 | Baron et al. .................. | 707/200 |
| 2010/0106821 A1* | 4/2010 | Akiyama et al. .............. | 709/224 |
| 2012/0117203 A1* | 5/2012 | Taylor et al. .................. | 709/220 |
| 2012/0198057 A1* | 8/2012 | Ennis et al. ................... | 709/224 |
| 2013/0246587 A1* | 9/2013 | Ennis et al. ................... | 709/220 |

OTHER PUBLICATIONS

"Checking User Input for Program Commands", SAP Library—System Security, retrieved on Oct. 26, 2012 from help.sap.com/saphelp_NW04s/helpdata/en/37/676642991c1053e10000000a155106/content.htm, 2 pages.
"System Center 2012 Configuration Manager", Microsoft, retrieved on Oct. 26, 2012 from www.microsoft.com/en-us/server-cloud/system-center/configuration-manager-2012.aspx, 2 pages.
"20.3.5.1. Driver/Datasource Class Names, URL Syntax and Configuration Properties for Connector/J", MySQL 5.0 Reference Manual, retrieved on Oct. 26, 2012 from dev.mysql.com/doc/refman/5.0/en/connector-j-reference-configuration-properties.html, 11 pages.
"OVAL—Open Vulnerability and Assessment Language", The MITRE Corporation, retrieved on Oct. 26, 2012 from oval.mitre.org/index.html, 3 pages.
"Side by Side Configuration Incorrect", CodeProject, Nov. 11, 2009, 3 pages.
"urlfilter—The URL filter add-on", retrieved on Oct. 26, 2012 from www.urlfilter.net, May 17, 2008, 1 page.

* cited by examiner

*Primary Examiner* — Kamini Patel
(74) *Attorney, Agent, or Firm* — Brake Hughes Bellermann LLP (57) ABSTRACT

The embodiments provide a data processing apparatus including a runtime check identifier configured to determine, in response to a request to execute a function of the application, whether a runtime check descriptor corresponding to the function is stored in a database and select the runtime check descriptor if the runtime check descriptor is determined as stored in the database. The selected runtime check descriptor provides, in part, at least one configuration check of a component related to an execution of the function. The data processing apparatus also includes a system component configured to invoke a system management tool to perform the at least one configuration check, and a runtime check controller configured to receive results of the at least one configuration check and perform at least one action specified in the selected runtime check descriptor based on the received results.

17 Claims, 4 Drawing Sheets

FIG. 1

```
201  <configuration _check target="software_function_y">
         <check                                                    202-1
  204 ──── id="oval:database:def;1"    // OVAL check id in sys mgmt tool
  206 ──── buffer="0"                  // in hours, 0 = no buffer
  208 ──── unchanged="boolean"         // for buffered checks, look at CMS
  210 ──── system="dbhost"             // target system
         >

202-2  <check id="oval:as:def:1" system="appserver.company.com"/>
  202-3  <check id="oval:firewall:def:1" system="192.168.0.1"/>
  202-4  <check id="oval:windows:def:1" system="192.168.0.2"/>

<behavior>

<criteria>  // working on the individual check results
  212 {         <expression>_</expression>
              </criteria>

<action>           // if criteria met, to be performed
                  <warn email="admin@company.com"/>
                  <raise_exc/>    // to be handled by the service caller
  214 {       </action>
         </behavior>
     </configuration_check>
```

RUNTIME CONFIGURATION CHECKS FOR COMPOSITE APPLICATIONS

BACKGROUND

Security and compliance of software systems may depend on the appropriate configuration of many different information technology (IT) components. For example, a software system lifecycle typically starts with a planning and design phase, where the architecture of the software system is planned. The deployment phase implements the design concept, and includes the installation of all relevant software components (e.g., web applications, application servers, databases, etc.) as well as the initial configuration of these components. The security-relevant parts of the configuration settings are initially intended to execute the application in a secure and compliant manner. However, at the operations phase (in which the application is productively utilized), the configuration settings may be changed, which may result in a risk that a security-relevant setting is altered in an unintended way. This risk may occur for several reasons: people performing configuration changes are typically different from those who planned and deployed an application; the original motivation to configure a component may not have been documented; and/or or the security implications of a configuration setting may not be evident.

However, to prevent insecure configuration settings, security administrators or auditors may check the configuration to see whether the configuration settings still meet expectations. There are several conventional approaches that control the change, validation, and audit of configuration settings of the software system. In one example, an Information Technology Infrastructure Library (ITIL) change management process may describe the way how configuration changes in software systems shall be requested, approved, and deployed. In another example, a system management tool may automatically validate the configuration settings at regular intervals and generate an alarm if any incorrect, potentially harmful setting is discovered. However, these conventional approaches are not linked to the actual application runtime. As such, they do not prevent the execution of an application, which has been configured incorrectly.

For example, the ITIL change management process may coordinate the interaction of various stakeholders that altogether aim to prevent inappropriate settings. If, for instance, a change is made without going through the ITIL change management process, or if the change request reviewer does not understand the security impact of a configuration change, the modification can be implemented even though an application is configured in an insecure or non-compliant manner. The system management tool, on the other hand, only aims at discovering dangerous configuration settings at regular intervals, which qualifies them as merely detection controls. However, such conventional approaches cannot prevent an application from being executed during runtime in the event that the application is configured incorrectly. In other words, the conventional approaches merely detect an incorrect configuration setting, but do not employ preventive measures that avoid applications from be executed in an insecure or non-compliant manner.

SUMMARY

Embodiments provide a data processing apparatus for implementing a runtime configuration check for an application in a system. The data processing apparatus includes a runtime check identifier configured to determine, in response to a request to execute a function of the application, whether a runtime check descriptor corresponding to the function is stored in a database storing a plurality of runtime check descriptors and select the runtime check descriptor if the runtime check descriptor is determined as stored in the database. The selected runtime check descriptor provides, in part, at least one configuration check of a component related to an execution of the function. The data processing apparatus also includes a system component configured to invoke a system management tool to perform the at least one configuration check provided by the selected runtime check descriptor, and a runtime check controller configured to receive results of the at least one configuration check from the system management tool and perform at least one action specified in the selected runtime check descriptor based on the received results.

The runtime check descriptor may provide a first configuration check for a first component and a second configuration check for a second component, and the second component may be different than the first component. In one example, the first application component and the second application component may be one of a web application, application server, database, operating system and network device within the system. Also, each runtime check descriptor of the plurality of runtime check descriptors may correspond to a different function of the application.

The runtime check identifier configured to determine and select the runtime check descriptor from the database may include evaluating at least one condition against at least one attribute specified in the request. The selected runtime check descriptor may include an identification information (ID) attribute that identifies the at least one configuration check, where the system component configured to invoke the system management tool to perform the at least one configuration check may include providing the ID attribute to the system management tool.

The selected runtime check descriptor may provide criteria information indicating one or more conditions on performing the at least one action and action information indicating a type of the at least one action, where the runtime check controller may determine that the one or more conditions is met based on the received results and perform the at least one action according to the type specified in the action information.

In one embodiment, the at least one action may include displaying an error message if the received results indicate that the at least one configuration check failed. Also, the at least one action may include disabling the function if the received results indicate that the at least one configuration check failed. Further, the at least one action may include modifying a behavior of the application if the received results indicate that the at least one configuration check failed.

The embodiments provide a method for implementing a runtime configuration check for an application in a system. The method includes determining, in response to a request to execute a function of the application, whether a runtime check descriptor corresponding to the function is stored in a database storing a plurality of runtime check descriptors, selecting the runtime check descriptor if the runtime check descriptor is determined as stored in the database, where the selected runtime check descriptor provides, in part, at least one configuration check of a component related to an execution of the function, invoking a system management tool to perform the at least one configuration check provided by the selected runtime check descriptor, receiving results of the at least one configuration check from the system management tool, and performing at least one action specified in the selected runtime check descriptor based on the received results.

The selected runtime check descriptor may include an identification information (ID) attribute that identifies the at least one configuration check, where the invoking the system management tool to perform the at least one configuration check may include providing the ID attribute to the system management tool.

The selected runtime check descriptor may provide criteria information indicating one or more conditions on performing the at least one action and action information indicating a type of the at least one action, where the performing step may include determining that the one or more conditions is met based on the received results, and performing the at least one action according to the type specified in the action information.

The at least one action may include modifying a behavior of the application if the received results indicate that the at least one configuration check failed. The runtime check descriptor may provide a first configuration check for a first component and a second configuration check for a second component, and the second component may be different than the first component.

The embodiments provide a computer program product tangibly embodied on a non-transitory computer-readable storage medium and including executable code that, when executed, is configured to cause a data processing apparatus to determine, in response to a request to execute a function of the application, whether a runtime check descriptor corresponding to the function is stored in a database storing a plurality of runtime check descriptors, select the runtime check descriptor if the runtime check descriptor is determined as stored in the database, where the selected runtime check descriptor provides, in part, at least one configuration check of a component related to an execution of the function, invoke a system management tool to perform the at least one configuration check provided by the selected runtime check descriptor, receive results of the at least one configuration check from the system management tool, and perform at least one action specified in the selected runtime check descriptor based on the received results.

The selected runtime check descriptor may include an identification information (ID) attribute that identifies the at least one configuration check, and the instructions include instructions to provide the ID attribute to the system management tool.

The selected runtime check descriptor may provide criteria information indicating one or more conditions on performing the at least one action and action information indicating a type of the at least one action, and the instructions include instructions to determine that the one or more conditions is met based on the received results, and perform the at least one action according to the type specified in the action information.

The at least one action may include modifying a behavior of the application if the received results indicate that the at least one configuration check failed. The runtime check descriptor may provide a first configuration check for a first component and a second configuration check for a second component, and the second component may be different than the first component.

DETAILED DESCRIPTION

The embodiments include a data processing apparatus (e.g., a runtime check service and database) for implementing a runtime configuration check for an application in an IT system. A configuration check may be a process in which the configuration settings of a component of an application or network device are evaluated in order to determine whether the configuration settings are properly configured to perform a function of the application. For example, the runtime check service may determine the appropriate configuration checks for an invoked function of the application, and react appropriately in the event that one of more of the configuration checks fail before the function is executed. As such, the runtime check service may be considered a preventive security control mechanism that avoids the execution of the application (or a component of the application) in an insecure and incompliant manner. Generally, the runtime check service may link configuration checks to the application runtime (thereby becoming preventive) and permit performance of configuration checks for the entire application stack (e.g., not only for the application itself) as well as any network device included in the IT system such as a firewall, router, and/or virtual private network (VPN) concentrator, for example.

The runtime check service may operate in conjunction with a database that stores a plurality of runtime check descriptors. Each runtime check descriptor may identify one or more configuration checks to be performed by a system management tool. In one embodiment, the runtime check descriptor provides all relevant configuration checks for a single function. As such, when a particular function of the application is invoked by a user, the runtime check service may determine whether a runtime check descriptor corresponding to the invoked function is stored in the database and select the runtime check descriptor if the runtime check descriptor is determined as stored in the database. The runtime check service may notify the system management tool to perform the configuration checks identified in the check descriptor, and depending on the results, control a behavior of the application in an appropriate manner before execution of the function is performed (e.g., if the results indicate that one or more of the configuration checks have failed, the runtime check service may restrict/modify the behavior of the application, disable the invoked function, and/or transmit a warning email to the appropriate parties). These and other features are further described below with reference to the figures.

Figure 1:
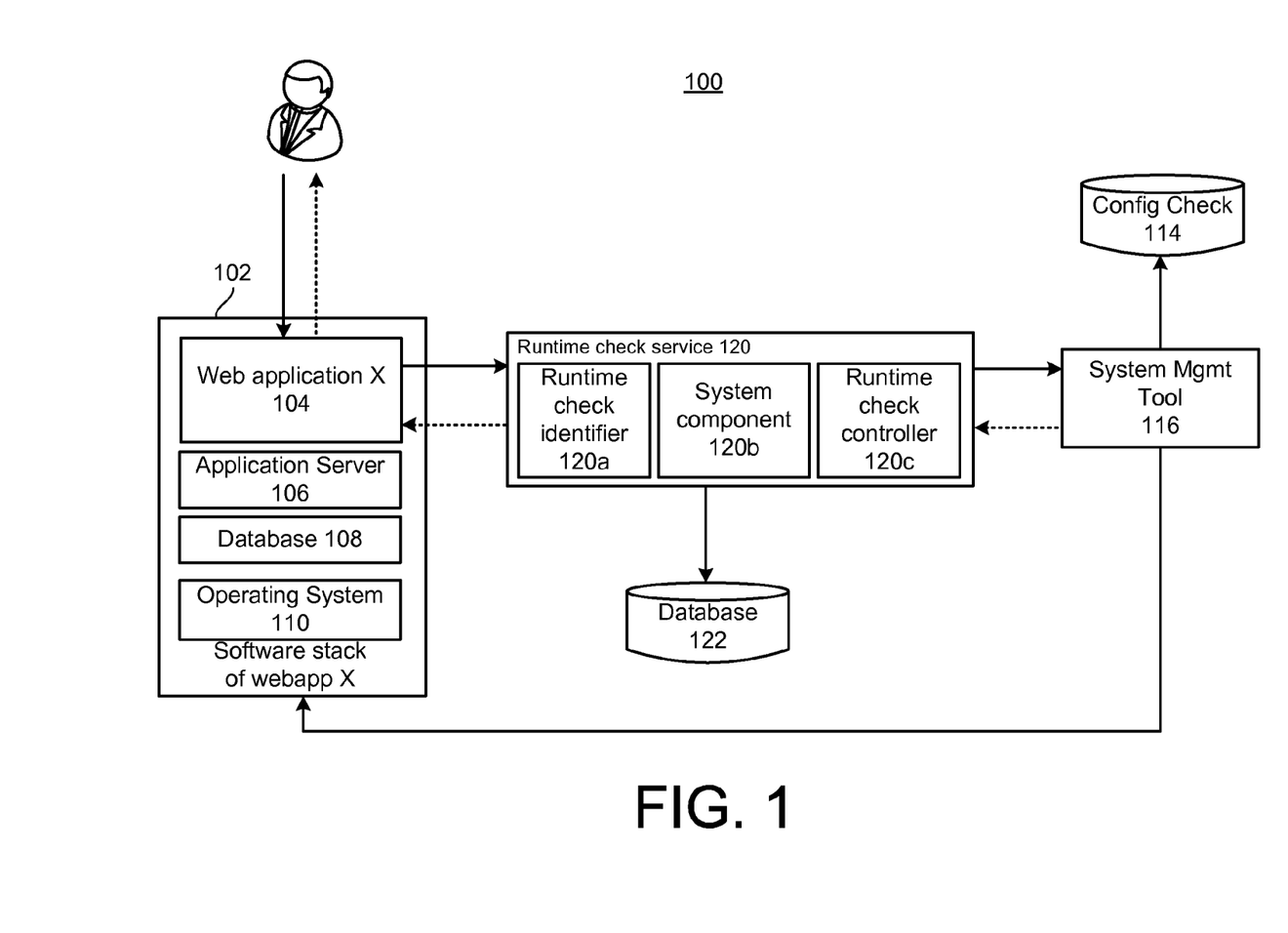
FIG. 1 illustrates a system having a runtime check service for implementing runtime configuration checks for an application according to an embodiment.

FIG. 1 illustrates a system 100 having a runtime check service 120 for implementing runtime configuration checks for an application according to an embodiment. The system 100 includes an application having a software stack 102, the runtime check service 120, a database 122, a system management tool 116, and a configuration check database 114. The system 100 may include other components that are well known to one of ordinary skill in the art such as network devices configured to facilitate the exchange of data among components of the system 100. The network devices may include firewalls, routers, and/or VPN concentrators. The software stack 102 may include a plurality of components for implementing the application such as a web application 104, application server 106, database 108, and an operating system 110. The application of FIG. 1 depicts a general web application (e.g., webapp X). However, the embodiments encompass any type of application known in the art.

According to an embodiment, a function may be invoked by a user of the application, which prompts the runtime check service 120 to check the security configurations for the invoked function corresponding to the application. The runtime check service 120 may be invoked by any application component (e.g., the web application 104, the application server 106, the database 108, the operating system 110, and/or other front-end or backend application components), and may control a behavior of the invoked component in cases where incorrect configurations are found. The runtime check service 120 may represent a link between the calling application and the system management tool 116 that stores the actual configuration checks in the configuration check database 114. For example, the system management tool 116 may be any type of tool that performs configuration checks. In one particular example, the system management tool 116 may utilize Open Vulnerability Assessment Language (OVAL), which is an XML-based language to describe configuration checks. The system management tool 116 may employ OVAL to perform the actual configuration checks.

The runtime check service 120 may include a runtime check identifier 120a, a system component 120b, and a runtime check controller 120c. For example, in response to the invoked function, the runtime check identifier 120a may determine whether a runtime check descriptor corresponding to the invoked function is stored in the database 122. The database 122 may store a plurality of runtime check descriptors, where each runtime check descriptor may correspond to a different function of the application. For example, the runtime check identifier 120a may search the database 122 for the runtime check descriptor corresponding to the invoked function, and then subsequently select the runtime check descriptor if the runtime check descriptor is determined as stored in the database 122. In general, the selection of the runtime check descriptors may depend on the application context. The application context may be understood as an arbitrary number of attributes to be provided by the invoked application. These attributes may be provided by the invoked application at or around the time when the runtime check service 120 is prompted to check the security settings of the application. The attributes may be the name of the invoked function, the customer's name, the industry to which the customer belongs, and/or the security requirements attached to the customer, for example. The runtime check identifier 120a may evaluate one or more conditions against the one or more attributes in order to identify whether there is a runtime check descriptor corresponding to the invoked function. In one particular example, if the attribute is the name of the function, the runtime check identifier 120a may receive the name of the function and select the runtime check descriptor corresponding to the invoked function when the name of the function provided by the calling application matches a name of the function provided in the stored runtime check descriptor. The same rationale may be applied when the attribute is the customer's name, the industry to which the customer belongs and/or one or more security requirements attached to the customer. Also, according to another embodiment, the runtime check identifier 120a may determine and select any number of runtime check descriptors that directly or indirectly correspond to an execution of the function.

Each runtime check descriptor may provide, in part, one or more configuration checks related to an execution of a corresponding function. As indicated above, a configuration check may be a process in which the configuration settings of a component of an application or network device are evaluated in order to determine whether the configuration settings are properly configured to perform a function of the application. Each runtime check descriptor may identify one or more configuration checks to be carried out by the system management tool 116. A runtime check descriptor may identify a configuration check by providing the name of the configuration check, a code that represents the configuration check, or any type of parameter/value that is sufficient to identify the configuration check. According to the embodiments, each runtime check descriptor may provide all the configuration checks relevant to the corresponding function, which may span across multiple, possibly distributed application components such as the web application 104, the application server 106, the database 108, the operating system 110 and/or any network device.

In addition, each runtime check descriptor may specify one or more actions to be taken in the event that one or more of the configuration checks have failed, e.g., in the case that the system management tool 116 discovers a misconfiguration. The one or more actions may include restricting/modifying a behavior of the application and/or more specific actions such as displaying an error message, preventing the invoked function to be executed, and/or transmitting an email notification. However, the one or more actions may encompass virtually any type of action that controls the behavior of the application. The details of the runtime check descriptor are further described with reference to FIG. 2.

Referring to FIG. 1, after the runtime check identifier 120a has determined and selected the appropriate runtime check descriptor corresponding to the invoked function, the runtime check identifier 120a may read the selected runtime check descriptor in order to obtain the identified configuration checks. The system component 120b may be configured to invoke the system management tool 116 to perform the one or more configuration checks provided by the selected runtime check descriptor. For example, the system component 120b may provide identification information that identifies the configuration checks (and optionally information indicating the system(s) that is/are the target of the configuration checks) to the system management tool 116. The system management tool 116 may used this information to select the actual configuration checks stored in the configuration check database 114. Then, the system management tool 116 may perform such configuration checks, e.g., by reading configuration files, registry keys, or similar configuration stores. The results are provided to the runtime check service 120.

Upon receiving the results, the runtime check controller 120c is configured to control a behavior of the application depending on the results of the configuration checks. For instance, the runtime check controller 120c may receive the results of the configuration checks from the system management tool 116, and perform at least one action specified in the selected runtime check descriptor based on the received results. For example, if the received results indicate that the configuration checks have passed, the runtime check controller 120c may permit the invoked function to proceed normally. However, if the received results indicate that at least one configuration check has failed, the runtime check controller 120 may perform the action(s) specified in the runtime check descriptor. Furthermore, according to another embodiment, the runtime check controller 120c may evaluate the received results against one or more conditions, which also may be provided in the runtime check descriptor. If the received results meet the conditions specified in the runtime check descriptor, the runtime check controller 120c may then perform the specified action. Also, the runtime check controller 120c may store the results in a storage unit associated with the runtime check service 120. The runtime check controller 120c may use the past results in the event that the function is subsequently invoked again (this feature is further explained below). Also, according to another embodiment, the runtime check controller 120c may provide a message to the application, where the message includes the received results and/or any details on the performed configuration checks. The application may react appropriately, e.g., executes, terminates, or restricts the invoked function.

The behavioral control by the runtime check controller 120c is further described by way of the following example. According to one example, the application may be a web application to an online sale of products. The web application may have the software stack 102 described above, and may be subject to different security threats, many of which are caused by configuration settings. The web application may have a product catalogue that allows customers to browse the offered products, and a management console that allows system administrators to access and modify core elements of the sales application. The access to an interface of the management console may be restricted to internal employees with help of a corresponding web application firewall setting. Also, the web application may have a web forum, which is a communication tool that allows customers to exchange information and give feedback to individual products. The web forum may be subject to Cross-site scripting (XSS) attacks, partly mitigated by an application server setting that automatically filters user input for malicious JavaScript, and automatically encodes any user-provided input before including the input in a website. Further, the web application may include a logon page that allows web users to access a personal area, where past purchases can be accessed or personal data is maintained. The submission of user credentials (passwords) on the logon page may be protected via a Secure Sockets Layer (SSL) through an application server setting such that credentials are protected from eavesdropping. In addition, the web application may include a search function that allows searching in the product catalogue. The search function component may be subject to Structured Query Language (SQL) injection attacks, partly mitigated by a database setting that forbids the concatenation of different SQL statements.

According to an embodiment, the runtime check controller 120c may control the behavior of above-described web application functions depending on the status of other components' security setting. For example, the runtime check controller 120c may disable the management console if the receive results indicate that the web application firewall is not properly configured. Also, the runtime check controller 120c may disable the web forum if the receive results indicate that the application server does not properly filter and encode user-input, disable the logon page if the receive results are not secured using Hypertext Transfer Protocol Sure (HTTPS), and/or disable the search function if the receive results indicate that the database protection against the SQL injections is disabled. As such, these security measures can be taken on a very fine-granular level, without affecting the product catalogue, being one of the central features of an online product store.

Figure 2:
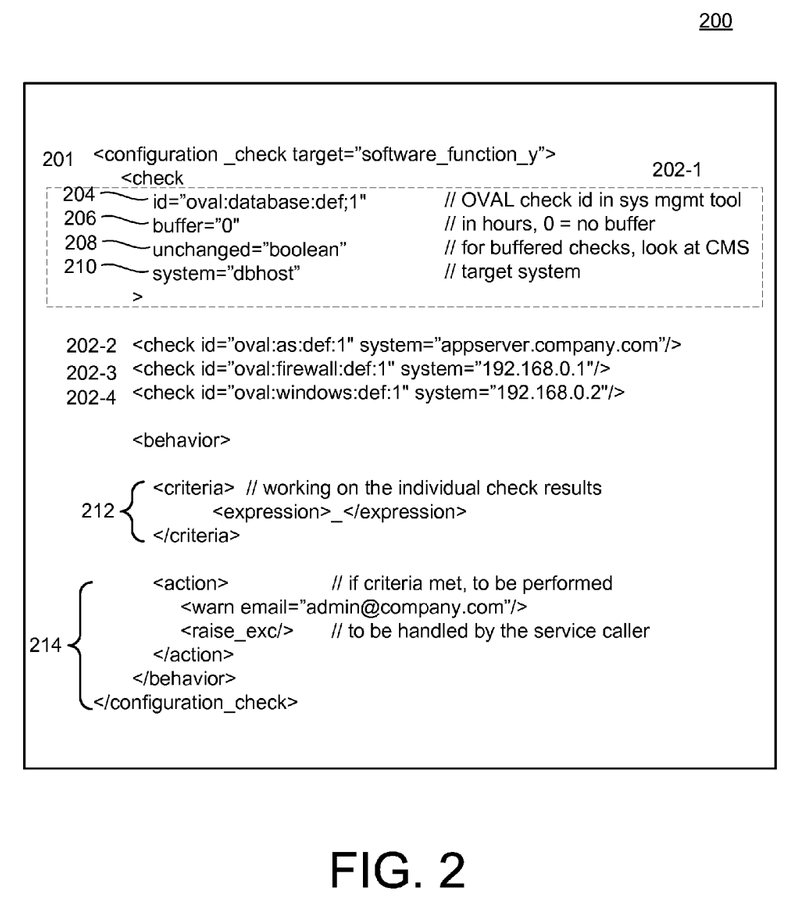
FIG. 2 illustrates an example runtime check descriptor according to an embodiment.

FIG. 2 illustrates an example runtime check descriptor 200 according to an embodiment. The runtime check descriptor 200 is an example of one runtime check descriptor that may be stored in the database 122. As may be appreciated, many other runtime check descriptors similar to the runtime check descriptor 200 may be provided in the database 122. The runtime check descriptor 200 may identify, or otherwise be associated, with a particular function of the application. As such, according to one embodiment, each runtime check descriptor stored in the database 122 may be associated with a different function. As further described in detail below, the runtime check descriptor may identify all configuration checks for all application components relevant for a given function (e.g., element checks), and may identify one or more actions to be trigged in the case of misconfigurations (e.g., element behavior).

In this particular example, within the configuration element, the runtime check descriptor 200 includes a target attribute name 201 indicating the name of the function, e.g., software_function_y, which is a generic business function. However, the embodiments encompass any other type of mechanism for identifying a particular runtime check descriptor such as the customer name, the industry to which the customer belongs, and/or the security requirements attached to the customer, for example. If the invoked function corresponds to the software_function_y, the runtime check identifier 120a may determine that the runtime check descriptor 200 is stored in the database 122 by matching the name of the function (which may be provided by the calling application) with the target attribute name 201. However, more generally, the runtime check identifier 120a may evaluate a condition provided by the calling application against the attribute provided in the runtime check descriptor. For example, instead of providing the target attribute name 201, the runtime check descriptor may provide some other type of attribute from the application context (e.g., customer name). The runtime check identifier 120 may then determine whether the condition provided by the calling application meets the specified attribute. Therefore, the target attribute name 201 (or some other type of attribute) may represent the link between the semantics of the application and the relevant configuration checks and actions described in the child nodes of the configuration element.

Also, the runtime check descriptor 200 may identify one or more configuration checks 202. In one embodiment, the runtime check descriptor 200 may provide all the configuration checks relevant to the function, which may span across multiple application components. For example, a first configuration check may occur on a first component within the system 100, and a second configuration check may occur on a second component within the system 100, where the second component is different than the first component. Therefore, it may be appreciated that the embodiments encompass a mechanism that permits configuration checks across multiple components (e.g., not just the application itself). In this example, the runtime check descriptor 200 provides four configuration checks such as a first configuration check 202-1 (which is illustrated in an expanded view with comments), a second configuration check 202-2, a third configuration check 202-3 and a fourth configuration check 202-4. The first-fourth configuration checks 202 may be considered all the configuration checks relevant to the software_function_y.

The first configuration check 202-1 may include an ID attribute 204 that identifies a corresponding configuration check, which may encompass any type of value/parameter/code. However, the ID attribute 204 may be a value that is recognized by the system management tool 116. In other words, the ID attribute 204 may represent a link between the runtime check service 120 and the system management tool 116. For instance, if the system management tool 116 is the OVAL-type system management tool, the ID attribute 204 may be the OVAL identifier. According to an embodiment, the system component 120b may be configured to invoke the system management tool 116 by providing the ID attribute 204 to the system management tool 116. Based on the ID attribute 204, the system management tool 116 may locate and select the actual configuration check from the configuration check database 114.

The first configuration check 202-1 may include a system attribute 210. The system attribute 210 may indicate the system (e.g., the physical host, application component) on which the first configuration check 202-1 must be performed. For example, the system attribute 210 may be relevant since not all components on which the application depends necessarily operate on the same physical host. Further, if a configuration check relates to a database configuration, one must not only consider the host where the database operates on, but also that one host may have several databases installed. In this context, the system attribute 210 may identify a specific database installation on a particular host. Therefore, in addition to the ID attribute 204, the system component 120b may also provide the system attribute 210 to the system management tool 116.

The first configuration check 202-1 may include a buffer attribute 206. The buffer attribute 206 may indicate whether the runtime check service 120 accepts buffered results (e.g., to avoid performance issues caused by a large number of configuration checks 202). A value of 0 may indicate that the first configuration check 202-1 must be performed, and a positive value may indicate the acceptable timeframe of past configuration checks (in, for example, hours before the actual call of the runtime check service), or vice versa. In this case, in response to the invoked function, the runtime check identifier 120a may read the selected runtime check descriptor 200, and determine the value of the buffered attribute 206. If the buffered attribute 206 indicates that the first configuration check must be performed (as shown in FIG. 2), the system component 120b will go ahead and invoke the system management tool 116 to perform the first configuration check 202-1. However, if the buffered attribute 206 indicates that the runtime check service 120 accepts buffered results and the previous results are within a specified time period, the system component 120b will not invoke the system management tool 116 to perform another configuration check 202-1, and the runtime check controller 120c accepts the past results for determining whether any action is warranted as specified by the runtime check descriptor.

The first configuration check 202-1 may include an unchanged attribute 208. The unchanged attribute 208 may be used in conjunction with positive buffer values to verify if a change management system has received notice of a configuration change in the relevant buffer timeframe, and which would invalidate the buffered result. The other configuration checks (e.g., 202-2, 202-3, 202-4) include similar types of information with the exception that they are performed on different application components (e.g., application system, firewall, operating system).

When the function Y is invoked, the runtime check identifier 120a determines and selects the runtime check descriptor 200 based on the attribute type (e.g., name of the function). The system component 120b may invoke the system management tool 116 to perform the first-fourth configuration checks 202, which may include providing the ID attribute 204 and possibly the system attribute 210 for these configuration checks. Also, as noted above, if a configuration check accepts buffered results and the buffered results are within the specified time frame, the system component 120b will not invoke the system management tool 116 to perform that particular configuration check (e.g., the system component 120b will not provide the ID attribute 204). As such, depending on the value of the buffer attribute 206, the system management tool 116 may perform one, two, three or more configuration checks (or none at all).

Also, the runtime check descriptor 200 may include criteria information 212 specifying one or more conditions on performing the actions, and action information 214 indicating a type of action. For example, the criteria information 212 can be used to create conditions on the received results, e.g., to trigger actions only if all checks failed, one check failed on a particular system, etc. The conditions may be utilized to reflect the different importance of different configuration checks. The action information 214 provides information that controls the action of the runtime check service 120 in case the criteria are met. Potential actions may be to send a notification email to the application owner (which is an ITIL-defined role caring for a given application), or to grant an exception to the calling application, thereby allowing the application to react properly on the detected misconfiguration. However, the action information 214 may encompass virtually type of action as described above.

Figure 3:
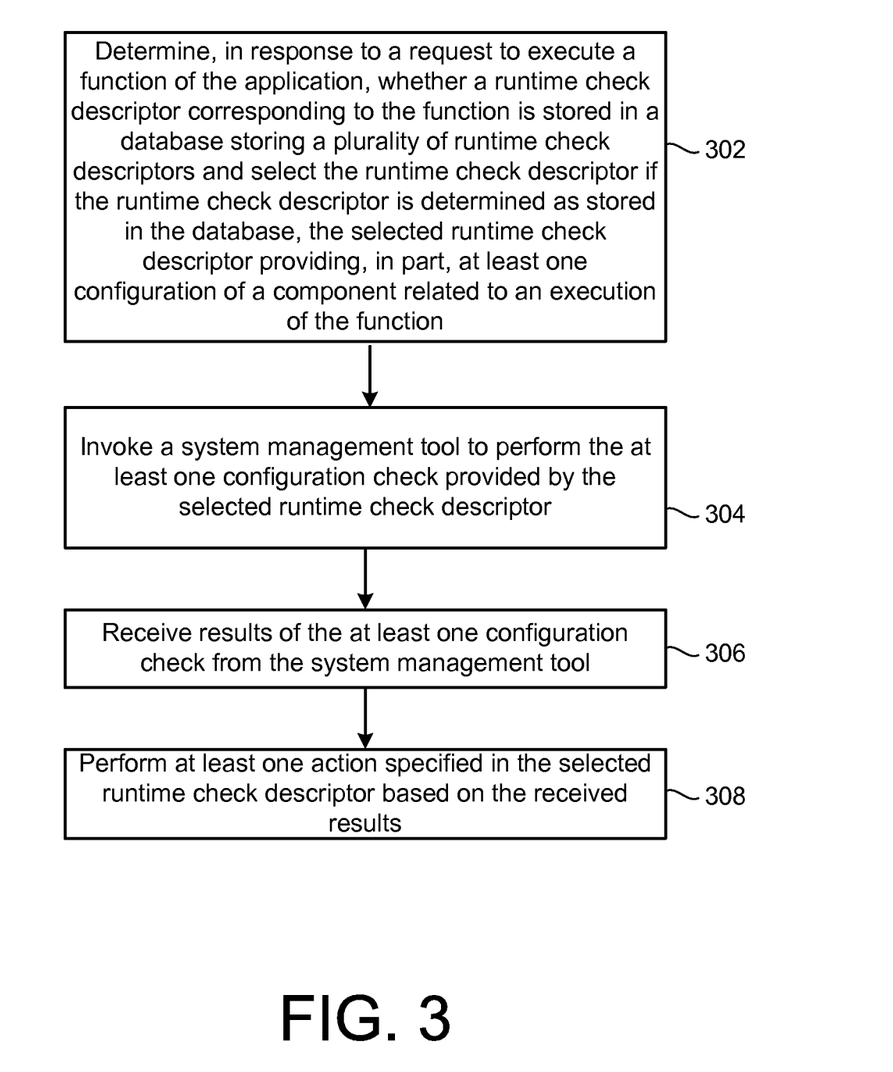
FIG. 3 illustrates a flowchart providing example operations of the system of FIG. 1 according to an embodiment.

FIG. 3 illustrates a flowchart providing example operations of the system 100 of FIG. 1 according to an embodiment. Although the flowchart of FIG. 3 illustrates the operations in sequential order, it will be appreciated that this is merely an example, and that additional or alternative operations may be included. Further, operations of FIG. 3 and related operations may be executed in a different order than that shown, or in a parallel or overlapping fashion.

In response to a request to execute a function of the application, a runtime check descriptor corresponding to the function is determined (or not determined) as stored in a database storing a plurality of runtime check descriptors and the runtime check descriptor may be selected if the runtime check descriptor is determined as stored in the database (302). For example, in response to an invoked function, the runtime check identifier 120a may determine whether a runtime check descriptor corresponding to the invoked function is stored in the database 122. The database 122 may store a plurality of runtime check descriptors, where each runtime check descriptor may correspond to a different function of the application. The selected runtime check descriptor provides, in part, at least one configuration check of a component related to an execution of the function. For example, the runtime check identifier 120a may search the database 122 for the runtime check descriptor corresponding to the invoked function, and then subsequently select the runtime check descriptor if the runtime check descriptor is determined as stored in the database 122.

A system management tool may be invoked to perform the at least one configuration check provided by the selected runtime check descriptor (304). For example, after the runtime check identifier 120a has determined and selected the appropriate runtime check descriptor corresponding to the invoked function, the runtime check identifier 120a may read the selected runtime check descriptor in order to obtain the identified configuration checks. The system component 120b may be configured to invoke the system management tool 116 to perform the one or more configuration checks provided by the selected runtime check descriptor. For example, the system component 120b may provide identification information that identifies the configuration checks (and optionally information indicating the system(s) that is/are the target of the configuration checks) to the system management tool 116. The system management tool 116 may used this information to select the actual configuration checks stored in the configuration check database 114. Subsequently, the system management tool 116 may perform such configuration checks, e.g., by reading configuration files, registry keys, or similar configuration stores.

Results of the at least one configuration check may be received from the system management tool (306). For example, the runtime check controller 120c may receive the results of the at least one configuration check from the system management tool 116.

At least one action specified in the selected runtime check descriptor may be performed based on the received results (308). For example, the runtime check controller 120c may be configured to control a behavior of the application depending on the results of the configuration checks. For instance, the runtime check controller 120c may receive the results of the configuration checks from the system management tool 116, and perform at least one action specified in the selected runtime check descriptor based on the received results. According to one example, if the received results indicate that the configuration checks have passed, the runtime check controller 120c may permit the invoked function to proceed normally. However, if the received results indicate that at least one configuration check has failed, the runtime check controller 120c may perform the action specified in the runtime check descriptor. Furthermore, according to another embodiment, the runtime check controller 120c may evaluate the received results against one or more conditions, which also may be provided in the runtime check descriptor. If the received results meet the conditions specified in the runtime check descriptor, the runtime check controller 120c may then perform the specified action.

Figure 4:
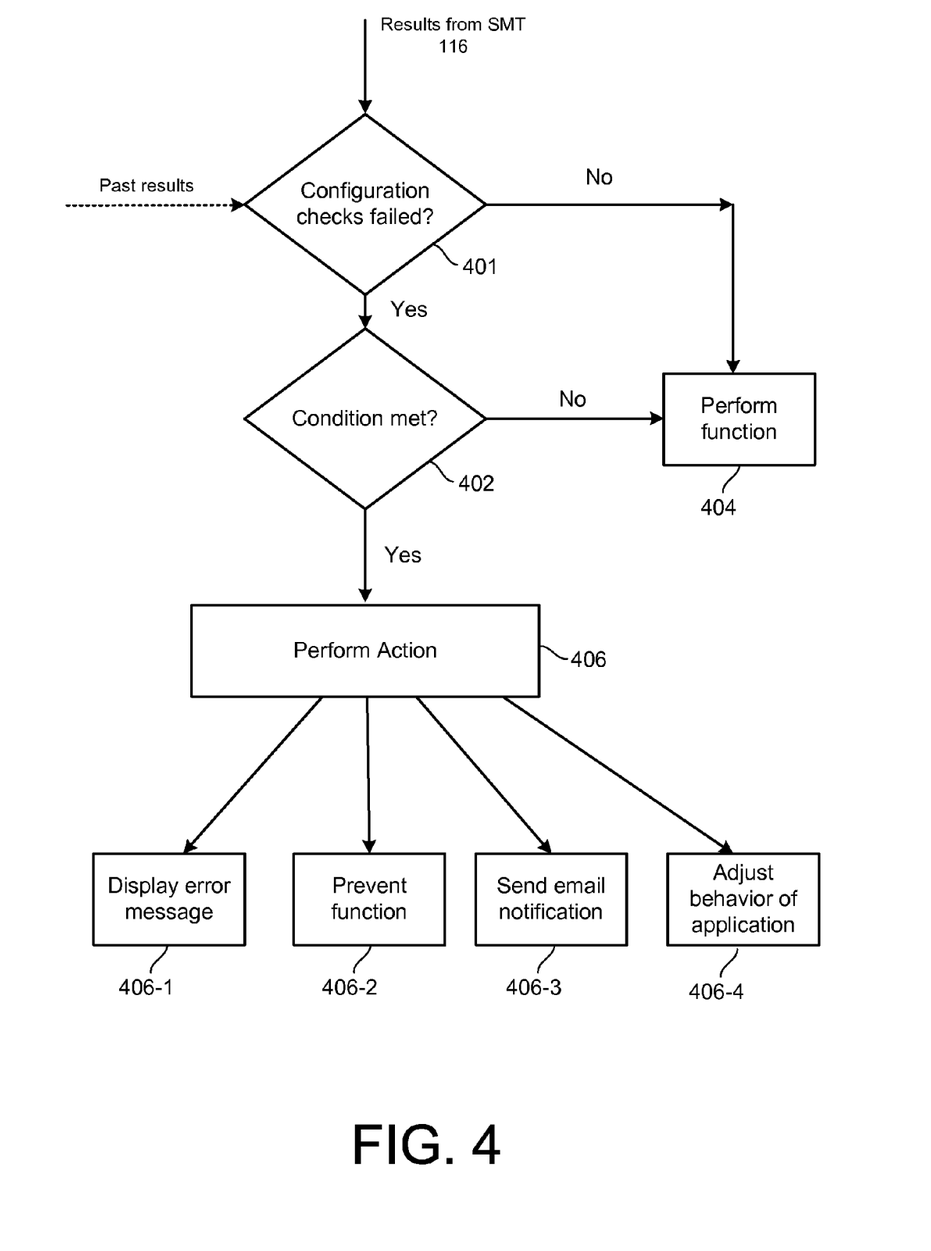
FIG. 4 illustrates a flowchart providing example operations of a runtime check controller according to an embodiment.

FIG. 4 illustrates a flowchart providing example operations of the runtime check controller 120c according to an embodiment. Although the flowchart of FIG. 4 illustrates the operations in sequential order, it will be appreciated that this is merely an example, and that additional or alternative operations may be included. Further, operations of FIG. 4 and related operations may be executed in a different order than that shown, or in a parallel or overlapping fashion.

Configuration checks may be determined as failed (or not failed) (401). For example, the runtime check controller 120c may receive the results for the configuration checks from the system management tool 116 and/or receive past results if buffered results are accepted for the configuration checks. If the results/past results indicate that none of the configuration checks has failed (NO), the runtime check controller 120c may permit the function to be executed (404). If at least one configuration check has failed, a condition is determined as met (or not met) (402). For example, the runtime check controller 120c may determine whether one or more conditions specified in the criteria information 112 of the runtime check descriptor is/are met. The conditions may include that at least three configuration checks must have failed, or that only one configuration check has failed. However, the embodiments encompass any type of condition for evaluating whether to proceed to an action. If the condition is not met, the function may be performed as normal (404). However, if the condition is met, the runtime check controller 120c may perform at least one action specified by the action information 214 in the runtime check descriptor (406). For example, the at least one action may include displaying an error message (406-1), preventing the function to be executed (406-2), sending an email notification (406-3) and/or adjusting a behavior of the application (406-4). The above actions are merely provided as examples, where the embodiments encompass any type of action that affects the operation of the application.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A data processing apparatus for implementing a runtime configuration check for an application in a system, the data processing apparatus comprising:
   at least one processor;
   a runtime check identifier configured to cause the at least one processor to intercept a request to execute an invoked function of an application,
   the runtime check identifier configured to cause the at least one processor to search a database storing a plurality of runtime check descriptors to determine whether the invoked function has a runtime check descriptor stored in the database, the runtime check descriptor of the invoked function identifying at least one configuration check to be performed by a system management tool and at least one action to be taken depending on an outcome of the at least one configuration check;
   a system component configured to cause the at least one processor to send an identifier that identifies the at least one configuration check to the system management tool to perform the at least one configuration check; and
   a runtime check controller configured to cause the at least one processor to receive results of the at least one configuration check from the system management tool, consult the runtime check descriptor of the invoked function, and perform the at least one action as identified in the runtime check descriptor based on the received results,
   wherein the runtime check descriptor of the invoked function includes criteria information indicating one or more conditions on performing the at least one action and action information indicating a type of the at least one action, wherein the runtime check controller is configured to determine that the one or more conditions is met based on the received results and perform the at least one action according to the type specified in the action information.

2. The data processing apparatus of claim 1, wherein the application is implemented by a software stack, the runtime check descriptor identifying any configuration checks relevant to the invoked function across the software stack.

3. The data processing apparatus of claim 2, wherein the software stack includes a web interface, an application server, a database, and an operating system.

4. The data processing apparatus of claim 1, wherein each runtime check descriptor of the plurality of runtime check descriptors stored in the database corresponds to a different function of the application, wherein the runtime check identifier is configured to identify the invoked function from the request and match the invoked function to one of the runtime check descriptors stored in the database.

5. The data processing apparatus of claim 1, wherein the runtime check identifier is configured to determine and select the runtime check descriptor of the invoked function from the database by matching an attribute from the runtime check descriptor to an attribute from the invoked function.

6. The data processing apparatus of claim 1, wherein the identifier of the at least one configuration check is an identification information (ID) attribute that identifies the at least one configuration check, wherein the system component is configured to transmit the ID attribute to the system management tool so that the system management tool can retrieve and perform the at least one configuration check.

7. The data processing apparatus of claim 1, wherein the at least one action includes displaying an error message if the received results indicate that the at least one configuration check failed.

8. The data processing apparatus of claim 1, wherein the at least one action includes disabling the function if the received results indicate that the at least one configuration check failed.

9. The data processing apparatus of claim 1, wherein the at least one action includes modifying a behavior of the application if the received results indicate that the at least one configuration check failed.

10. A method for implementing a runtime configuration check for an application in a system, the method comprising:
    providing a runtime check service as a link between an application and a system management tool that stores configuration checks;
    intercepting, by the runtime check service, a request to execute an invoked function of the application;
    searching, by the runtime check service, a database storing a plurality of runtime check descriptors to determine whether the invoked function has a runtime check descriptor stored in the database, the runtime check descriptor of the invoked function identifying at least one configuration check to be performed by the system management tool and at least one action to be taken depending on an outcome of the at least one configuration check;
    sending, by the runtime check descriptor, an identifier that identifies the at least one configuration check to the system management tool;
    receiving results of the at least one configuration check from the system management tool; and
    performing the at least one action specified in the runtime check descriptor of the invoked function based on the received results,
    wherein the runtime check descriptor of the invoked function includes criteria information indicating one or more conditions on performing the at least one action and action information indicating a type of the at least one action, wherein the performing includes determining that the one or more conditions is met based on the received results, and performing the at least one action according to the type specified in the action information.

11. The method of claim 10, wherein the identifier includes an identification information (ID) attribute that identifies the at least one configuration check, wherein the ID attribute is transmitted to the system management tool to perform the at least one configuration check.

12. The method of claim 10, wherein the at least one action includes modifying a behavior of the application if the received results indicate that the at least one configuration check failed.

13. The method of claim 10, wherein the runtime check descriptor identifies any configuration checks related to the invoked function including multiple configuration checks involving two or more components of the application.

14. A computer program product tangibly embodied on a non-transitory computer-readable storage medium and including executable code that, when executed, is configured to cause a data processing apparatus to:
    provide a runtime check service as a link between an application and a system management tool that stores configuration checks;

intercept, by the runtime check service, a request to execute an invoked function of the application;

search, by the runtime check service, a database storing a plurality of runtime check descriptors to determine whether the invoked function has a runtime check descriptor stored in the database, the runtime check descriptor of the invoked function identifying at least one configuration check to be performed by the system management tool and at least one action to be taken depending on an outcome of the at least one configuration check;

send, by the runtime check descriptor, an identifier that identifies the at least one configuration check to the system management tool;

receive results of the at least one configuration check from the system management tool; and perform the at least one action specified in the selected runtime check descriptor based on the received results, wherein the runtime check descriptor of the invoked function includes criteria information indicating one or more conditions on performing the at least one action and action information indicating a type of the at least one action, wherein the instructions to perform at least one action specified in the runtime check descriptor based on the received results include instructions to determine that the one or more conditions is met based on the received results and perform the at least one action according to the type specified in the action information.

15. The computer program product of claim 14, wherein the identifier includes an identification information (ID) attribute that identifies the at least one configuration check, wherein the instructions to send the identifier includes instructions to transmit the ID attribute to the system management tool.

16. The computer program product of claim 14, wherein the at least one action includes modifying a behavior of the application if the received results indicate that the at least one configuration check failed.

17. The computer program product of claim 14, wherein the runtime check descriptor of the invoked function includes all configuration checks related to the invoked function.

* * * * *